June 5, 1956 — E. H. BALL — 2,749,190
TRANSPORTING OF ROTARY MACHINES
Filed June 28, 1955
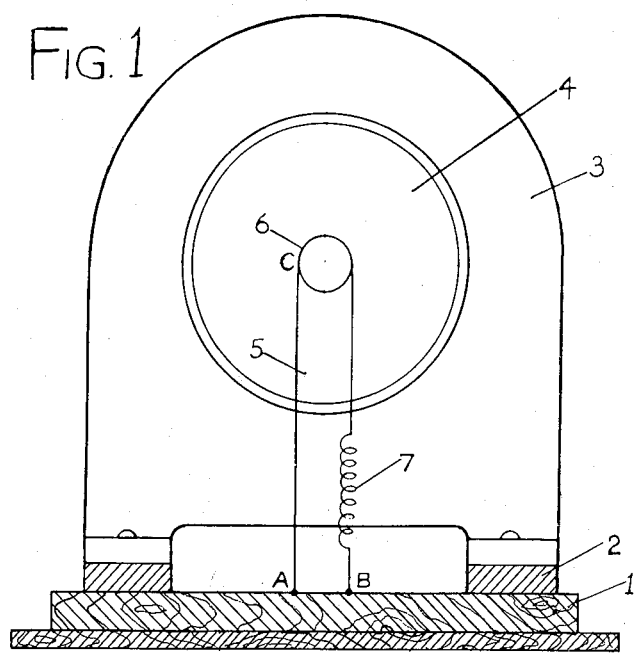
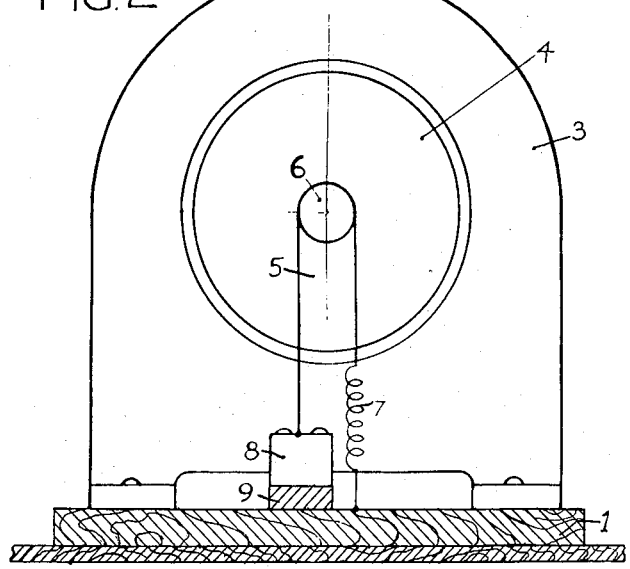
INVENTOR
ERIC HAROLD BALL
By
HIS ATTORNEY.

2,749,190
Patented June 5, 1956

United States Patent Office

2,749,190
TRANSPORTING OF ROTARY MACHINES

Eric H. Ball, Rugby, England, assignor to The British Thomson-Houston Company Limited, a British company Application June 28, 1955, Serial No. 518,589

5 Claims. (Cl. 308—1)

This invention relates to machinery having a rotary member mounted in ball, roller, needle or like bearings and is particularly concerned with protecting the bearings from damage when the machinery is in transit.

When a machine having such a rotary member, for instance a dynamo-electric machine, is being conveyed in, say, a packing case by normal means of transport, it is likely to be subjected to vibration and shock, and there is difficulty in mounting the machine within its packing case in such a manner that resultant motions are not transmitted to the machine. The rotary member, which may be mounted for instance in roller bearings, is normally stationary during transit, and the lines of contact between the rollers and the bearing faces thus would remain in the same angular positions. In these circumstances frequent axial movements of the rotary member, caused by vibration, tend to damage the bearing faces and rollers due to constant rubbing along their lines of contact.

This phenomenon has already been appreciated, and packing arrangements which produce a rotation of the rotor, by virtue of the vibratory motion, have been proposed hitherto.

Thus in one such arrangement the machine is resiliently mounted in its packing case and a ratchet wheel attached to the rotary member is arranged to cooperate with a pawl member on the packing case so that relative displacement occurring between the machine and the packing case due to vibration causes rotation of the ratchet wheel and thus of the rotary member of the machine in stepwise manner. In another arrangement the machine is rigidly mounted and a ratchet wheel on its rotary member co-operates with a pawl on a freely swinging pendulum so that as the pendulum oscillates due to vibration the ratchet wheel and thus the rotary member are rotated in discrete steps.

With such arrangements however, since the rotation of the rotary member takes place in sequential steps of predetermined magnitude, each roller will reoccupy its original position during each revolution of the rotary member with the result that there would still be a tendency for some portions of the bearing surfaces to be more worn by axial rubbing than others.

An object of the present invention is to provide an arrangement in which vibration or shock will cause continuous (as distinct from stepwise) rotation of the rotary member, so long as the vibration is within the amplitude and frequency limits for which the arrangement is designed.

According to the present invention machinery having a rotary member mounted in bearings is provided when in transit with a belt, tape, wire, cord, rope or other such flexible (that is non-rigid) drive member anchored adjacent its opposite ends and passing in frictional engagement at least partially round a generally cylindrical and coaxial surface on the rotary member which flexible drive member has tensioning spring means acting thereon at a location between the anchorage for one end of the flexible member and its engagement with said surface, while a resiliently mounted mass (which may be the machinery itself) is arranged to coact with the portion of the flexible member between its other end and said surface so as on oscillatory displacement due to vibration to alternately increase and decrease the effective distance between said other end and said surface; the spring means is then effective to take up the slack resulting in the flexible member on reduction of said distance with the result that during subsequent increase of this distance the portion of the flexible member spanning it produces at said surface by virtue of the frictional engagement a force tending to rotate the rotary member.

The cylindrical surface on the rotary member may be grooved to receive the flexible member and the term cylindrical is to be taken as including such grooved form.

During periods of vibration the increase and decrease of the distance referred to will be a repetitive action and it is contemplated that if the repetition rate, corresponding to the vibration frequency, is sufficiently high the rotary member will rotate continuously on account of its inertia. Thus if the tensioning force (F) exerted by the spring means is assumed to be constant, as it will approximately be in practice since the amplitude of displacement of the resiliently mounted mass will normally be small, then application of the usual belt drive theory shows that the resultant force (R1) tending to rotate the rotary member on increase of the distance referred to will be given by $$R1 = Fe^{\mu\theta} - F$$

whereas the resultant force (R2) tending to rotate the rotary member (in the opposite direction) on subsequent decrease of that distance will be given by $$R2 = F - Fe^{-\mu\theta}$$

where $\mu$ is the coefficient of friction between the flexible drive member and the cylindrical surface and $\theta$ is the angle of contact (in radians) between the flexible member and the cylindrical surface. From this it is apparent that there is a substantial difference between these resultant forces, and since they act at the same radius there will be a corresponding difference between the respective torques applied thereby to the rotary member; consequently, during periods of vibration rotation started by the first resultant force (R1) in one direction will continue in that direction so long as the vibration remains within predetermined limits of amplitude and frequency. To ensure continuous rotation in this manner, the spring force F must of course be so selected that the resultant force R2 is insufficient to check the rotation produced by the resultant force R1.

It has been assumed in the foregoing that the time constant of the spring tensioning means is shorter than the time constant of the resiliently mounted mass; if this is not so the difference between the resultant forces R1 and R2 will be even greater.

As will be appreciated the design and operation of the arrangement are dependent on a number of variables such for instance as the radius of the cylindrical surface engaged by the flexible member, the inertia of the rotary member, the force exerted by the tensioning spring means, the angle of contact and the coefficient of friction between the flexible member and the cylindrical surface, and the characteristics of the resilient mounting of the mass referred to. The choice of values for these variables is not critical however in view of the relatively large difference between the resultant forces tending to rotate the rotary member in opposite directions.

It is contemplated that the invention will generally be employed where the machinery is contained in a packing case, but it is also conceivable that the invention could be employed where the machinery is simply secured on, say, a floor of a transporting vehicle.

In carrying out the invention the tensioning of the flexible member may be effected by anchoring the appropriate end thereof through a spring of the required strength, or the flexible member may be caused to pass over a pulley or the equivalent spring-loaded in such direction as to apply the necessary tension.

As previously indicated the resiliently mounted mass may be the machinery itself in which event it is contemplated that the end of the flexible member opposite that between which and the cylindrical surface the spring means acts would be anchored fast with a rigid supporting structure on which the machinery is resiliently mounted— for instance a packing case or the floor of a transporting vehicle. Alternatively, the machinery may be rigidly mounted and this opposite end of the flexible member anchored on a separate mass which is carried by the supporting structure in a resilient manner with respect to the machinery.

For a fuller understanding of the invention two embodiments thereof as applied to a dynamo-electric machine will now be described with reference to the accompanying drawings in which:

Fig. 1 schematically illustrates an embodiment in which the machine itself constitutes the resiliently mounted mass, and Fig. 2 schematically illustrates an embodiment in which a separate resiliently mounted mass is employed.

In the embodiment of Fig. 1 the stator casing 3 of a dynamo-electric machine having its rotor 4 mounted for rotation within the stator on roller or other such bearings (not shown), is secured as by bolts on a supporting structure 1 which may for instance be the base of a packing case or the floor of a transporting vehicle. Resilient pads, cushions or the like 2 are interposed between the stator casing 3 and the supporting structure 1 so that the machine is resiliently mounted and in response to vertical vibration can accordingly move up and down in an oscillatory manner with respect to the structure 1.

A flexible (non-rigid) drive member 5 constituted by a belt, wire, string, tape, rope, cord or other such relatively inextensible material and having one end directly anchored to the structure 1 at the point A, passes in frictional engagement round the shaft 6 of the rotor 4, preferably being helically wound around the shaft 6 to make at least one complete turn, and at its other end is anchored through a tension spring 7 to a point B on the structure 1.

With this arrangement if the machine is momentarily displaced relatively towards the structure 1 due to vibration or a sudden jolt in the vertical direction, the flexible member 5 will tend to slacken round the shaft 6 but will be drawn over the shaft by the spring 7 so that tension in the flexible member 5 is maintained. As a result the length of the portion of the flexible member 5 between the point A at which its one end is anchored to the structure 1 and the point C at which it first contacts the shaft 6 will be shortened. Consequently, when the machine subsequently returns to its original position relative to the structure 1, or is otherwise displaced in that direction, the flexible member 5, by its frictional engagement with the shaft 6 will provide a torque on the shaft causing the rotor 4 to rotate through a small angle. Such vertical displacement of the machine relatively to the structure 1 will occur during periods of vibration as a repetitive action and as previously pointed out the result will be continuous rotation of the rotor due to its own inertia, provided that the magnitude and frequency of the vibration are within certain limits imposed by the parameters of the arrangement in any particular instance and that the force exerted by the spring 7 is suitably selected.

In the embodiment of Fig. 2 in which corresponding parts have been given the same reference numerals, the stator casing 4 of the machine is no longer resiliently mounted but in this instance is rigidly secured, again as by bolts, on the support structure 1. The end of the flexible drive member 5 remote from the end anchored through the tension spring 7 is this time secured to a heavy block 8 secured to the structure 1 with a resilient member 9 interposed so that the block 8 constitutes a resiliently mounted mass. Vertical vibration or shocks will cause oscillatory vertical displacement of the block 8, so that the distance between the block 8 and the first point of contact of the flexible member 5 with the shaft 6 will then alternately increase and decrease. Consequently it will readily be appreciated that a similar result will be obtained as with the arrangement of Fig. 1, leading as already explained to a continuous rotation of the rotor 4.

Instead of passing in frictional engagement round the shaft 6 as in the embodiments illustrated, it will be apparent that the flexible drive member 5 could pass round any other coaxial, cylindrical surface on the rotor 4; such surface may for instance be provided by a cylindrical member temporarily secured fast and coaxially with the shaft 6 while the machine is in transit.

It will be realised that this invention not only reduces the damage to the bearings of machines which are at present despatched when completely assembled, but it will also enable larger machines, the rotatable members of which are now despatched separately, to be transported as units.

What I claim is:

1. An arrangement for use during transit of machinery having a rotary member mounted in bearings, said member having a coaxial, generally cylindrical surface thereon, which arrangement comprises, in combination, a flexible drive member such as a belt, tape, rope, cord, wire and so on, anchored adjacent its opposite ends and passing in frictional engagement at least partly round said surface on the rotary member, spring tensioning means for the flexible member acting thereon at a location between the anchorage for one end and the position of engagement with said surface, and a resiliently mounted mass, which may be the machinery itself, co-acting with the portion of the flexible member between its other end and said surface to alternately increase and decrease the effective distance between said other end and said surface in response to oscillatory displacement of said mass due to vibration, the spring means being effective to take up the slack tending to result in the flexible member on reduction of said distance whereby during subsequent increase thereof the portion of the flexible member then spanning the distance produces at said surface by virtue of the frictional engagement a force tending to rotate the rotary member.

2. An arrangement for use during transmit of machinery having a rotary member mounted in bearings, said member having a coaxial, generally cylindrical surface thereon, which arrangement comprises, in combination, a support structure on which said machinery is resiliently mounted, a flexible drive member such as a belt, tape, rope, cord, wire and so on, anchored at opposite ends to said support structure and passing in frictional engagement at least partly round said surface on the rotary member, and spring tensioning means for the flexible member acting thereon at a location between said surface and the anchorage for one end, said spring means being effective on oscillatory displacement of the machinery caused by vibration to take up slack resulting in the flexible member due to displacement of the machinery in one direction, while the flexible member is effective by its frictional engagement with said surface to cause rotation of the rotary member on displacement of the machinery in the opposite direction.

3. An arrangement as claimed in claim 2 including as said spring means a tension spring through which the one end of the flexible member is anchored to the support structure, the other end being directly anchored to said structure.

4. An arrangement for use during transit of machinery having a rotary member mounted in bearings, said member having a coaxial, generally cylindrical surface thereon, which arrangement comprises, in combination, a support structure for the machinery, a flexible drive member such as a belt, tape, rope, cord, wire and so on passing in frictional engagement at least partly round said surface on the rotary member and anchored at one end to said structure, a resiliently mounted mass having the other end of the flexible member anchored thereon, said mass being resiliently mounted on said structure for oscillatory displacement with respect to the machinery due to vibration, and spring tensioning means for the flexible member acting thereon between its engagement with said surface and the anchorage for the first-mentioned end of the flexible member, said spring means being effective to take up slack resulting in the flexible member due to displacement of the resiliently mounted mass in one direction, while the flexible member is effective by its frictional engagement with said surface to cause rotation of the rotary member on displacement of said mass in the opposite direction.

5. An arrangement as claimed in claim 4 including as said spring means a tension spring through which the first-mentioned end of the flexible member is anchored to the support structure.

References Cited in the file of this patent

UNITED STATES PATENTS

| | | |
|---|---|---|
| 1,433,562 | Mansbendel | Oct. 31, 1922 |
| 2,563,302 | Atkinson et al. | Aug. 7, 1951 |
| 2,636,786 | Greenough | Apr. 28, 1953 |